United States Patent
Schneider (10) Patent No.: US 8,881,172 B2
(45) Date of Patent: Nov. 4, 2014

(54) CONFIGURATION INTERFACE MANAGER

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1233 days.

(21) Appl. No.: 12/025,656

(22) Filed: Feb. 4, 2008

(65) Prior Publication Data

US 2009/0199212 A1 Aug. 6, 2009

(51) Int. Cl.
| | |
|---|---|
| G06F 15/16 | (2006.01) |
| G06F 9/54 | (2006.01) |
| H04L 29/06 | (2006.01) |
| H04L 12/24 | (2006.01) |
| G06Q 10/06 | (2012.01) |

(52) U.S. Cl.
CPC ............... *H04L 63/20* (2013.01); *H04L 41/08* (2013.01); *G06Q 10/06* (2013.01)
USPC ............ 719/318; 709/221; 709/227; 709/229

(58) Field of Classification Search
None
See application file for complete search history.

(56) References Cited

U.S. PATENT DOCUMENTS

| | | | | |
|---|---|---|---|---|
| 6,272,518 | B1 * | 8/2001 | Blazo et al. | 718/102 |
| 7,680,797 | B1 * | 3/2010 | Singh et al. | 707/781 |
| 2003/0134648 | A1 * | 7/2003 | Reed et al. | 455/456 |
| 2004/0093512 | A1 * | 5/2004 | Sample | 713/201 |
| 2004/0210662 | A1 * | 10/2004 | Lim et al. | 709/229 |
| 2006/0095572 | A1 * | 5/2006 | Burke et al. | 709/227 |
| 2007/0245409 | A1 * | 10/2007 | Harris et al. | 726/5 |
| 2008/0040441 | A1 * | 2/2008 | Maes | 709/207 |
| 2008/0046576 | A1 * | 2/2008 | Wahl | 709/228 |
| 2008/0263636 | A1 * | 10/2008 | Gusler et al. | 726/4 |

OTHER PUBLICATIONS

Red Hat Command Center 3.18, Check Reference, Red Hat, Inc., 2007, 178 pages.
Red Hat Command Center, Users Guide 3.18, Red Hat, Inc., 2007, 318 pages.
Red Hat Command Center, Release Notes 3.18, Red Hat, Inc., 2007, 7 pages.
Red Hat Command Center 3.18, Setup and Installation Guide, Red Hat, Inc., 2007, 33 pages.
Webmin article, downloaded Apr. 29, 2008, http://www.webmin.com/, 3 pages.
mmcgrath—Metrics, http://mmcgrath.livejournal.com/742.html, Jan. 30, 2007, 1 page.

* cited by examiner

*Primary Examiner* — H S Sough
*Assistant Examiner* — Umut Onat
(74) *Attorney, Agent, or Firm* — Lowenstein Sandler LLP (57) ABSTRACT

A method and system for managing configuration interfaces. In one embodiment, a system includes a user interface for receiving a user login, causing a configuration process to be invoked, and receiving user input for managing the configuration process. A log file is used to store log file information in response to the received user input for managing the configuration process. The log file can be used by a process monitor to determine if there is any recent user activity. The process monitor can determine whether the log file has been changed in response to the received user input during a specific time interval. In response to a determination that the log file has not been changed in response to the received user input during the specific time interval, the process monitor can terminate the configuration process.

17 Claims, 5 Drawing Sheets

CONFIGURATION INTERFACE MANAGER

TECHNICAL FIELD

Embodiments of the present invention relate to managing networked computers and, more specifically, to manage configuration programs of networked computers and appliances.

BACKGROUND

Networked computes and appliances are used to transmit and fetch information to and from local sources (e.g., computers used in a business) and remote sources (e.g., enterprise services offered over the internet). The networked computers are typically owned and controlled by a wide variety of businesses, educational institutions, and individual users. The users of the networked computers can have a wide range of experience from beginner to expert levels, and can have differing levels of expertise (or lack thereof) within various categories of computer technologies.

Configuration, administration, and diagnosis of the networked computers can be accomplished by both local and remote administrators using an administration program. Providing remote administration allows, for example, a remote administrator to administer a system when sufficient expertise may be unavailable at a local level.

Further, the use of a common administration program allows the system to be managed both remotely and locally in the same way. For example, configuration files do not have to be maintained separately (or translated) for separate programs. Also, software development and deployment can be eased by using the same program on both local and remote systems. Additionally, a common user interface can be used which eases the learning curve and operating effort expended by administrators who manage both remote and local system.

Because the administration program can be used by a local user and/or a remote system administrator to configure the system, ports are opened and exposed that allow external processes to control the system. For example, when a local user logs in to administer (or diagnose) a local system, a local web administrator process is invoked (which the local user can use to administer or diagnose the system). If the local user did not log in having root authority, the local web administrator process can be (unintentionally) left running when a local user does not manually shutdown the local web administrator process. Because the local web administrative process contains exposed ports, a security risk exists that can allow an unauthorized process to try to exploit the open ports. This problem can be compounded by novice local administrators who do not appreciate the risks of leaving the local web administration process running with exposed ports and who forget to manually close the local web administration process.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for managing configuration interfaces. In one embodiment, a system includes a user interface for receiving a user login, invoking a configuration process, and receiving user input for managing the configuration process. A log file is used to store log file information in response to the received user input for managing the configuration process. The log file can be used by a process monitor to determine if there is any recent user activity. The process monitor, upon expiration of a timer, can determine whether the log file has been changed in response to the received user input during the first time interval used by the timer. In response to a determination that the log file has not been changed in response to the received user input during the first time interval preceding the expiration of the timer, the process monitor can terminate the configuration process.

In the following description, numerous specific details are set forth such as examples of specific systems, languages, components, etc., in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc.

Unless specifically stated otherwise as apparent from the following discussion, it is appreciated that throughout the description, discussions utilizing terms such as "processing" or "generating" or "calculating" or "determining" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The description that follows details an apparatus and method for managing instances of an administrator interface. A computer system includes an application such as a process monitor that manages the administrator interface. The process monitor determines that an instance of an administrator interface (web administrator) is being executed by the computer system. The process monitor invokes or polls a timer to measure a specified time period. In response to the measurement, the process monitor determines the status of the administrator interface. The status of the administrator interface can be determined, for example, by examining the log file produced by the administrator interface. The log file can be used to determine, for example, whether the administrator interface is currently being used by a user by examining the file date and time attribute of the log file for the administrator interface process. If the log file has not been updated within the time period measured by the timer, or example, the administrator interface process can be terminated. In an alternate embodiment, a message can be sent to the user to notify the user that the system can be shut down after a second time period if no user activity is detected.

Figure 1:
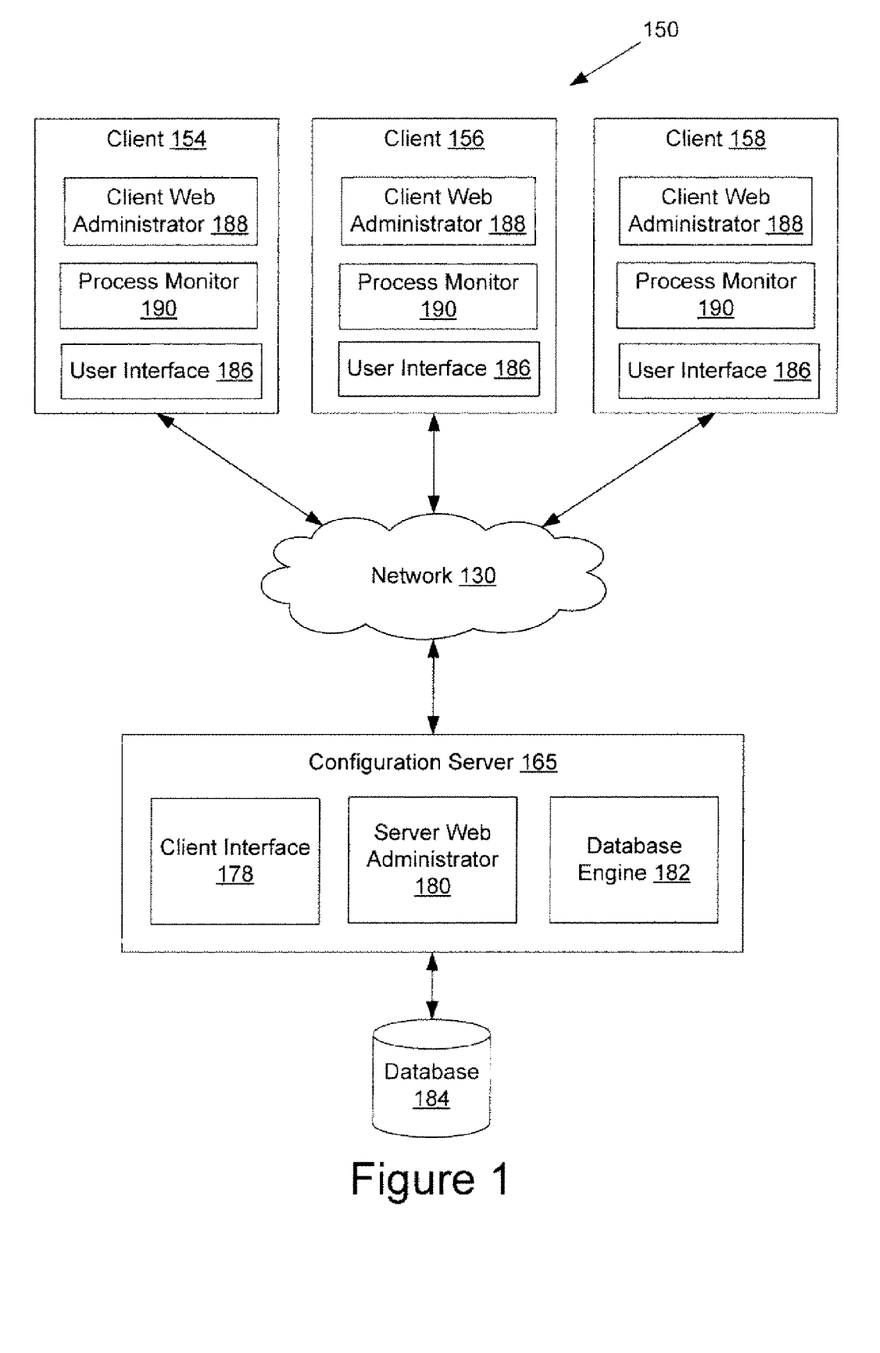
FIG. 1 illustrates an exemplary network architecture in which embodiments of the present invention may operate.

FIG. 1 illustrates an exemplary network architecture 150 in which embodiments of the present invention may operate. The network architecture 150 may include multiple clients such as 154, 156, and 158. A client may be a computing device such as a desktop computer, laptop computer, server etc., and may be operated by an IT administrator, a software developer or any other user.

Network architecture 150 also includes configuration server 165 coupled to the clients 154 through 158 via a network. 130 (e.g., a. private network such as LAN or a public network such as Internet). The configuration server 165 is operable to provide configuration services targeted to, and/or dependent on, specific clients. To provide such services for specific clients, it may be necessary to expose open ports for the configuration server 165 to provide services to the specific client.

Each client 154 through 158 may include a user interface 186 to allow users to view, and interact with, client processes and/or information on the Internet or a local network (not shown). The user interface 186 may be provided by a client web administrator 188. In addition, each client may host a process monitor 190. The client web administrator 188 can be invoked and used by a local user and/or remote user. A local user can use the user interface 186 provided by the client web administrator 188 to configure, administer, and diagnose problems, for example, within the client 156.

The process monitor 190 is operable to monitor the client web administrator 188 to determine if the client web administrator 188 is being actively used. The process monitor 190 can determine if the web administrator 188 is being actively used by, for example, monitoring a log file of the web administrator 188 process. If the web administrator 188 is not actively being used, the log file of the web administrator 188 process typically is not updated. If the log file has not been updated within a certain time period, the process monitor 190 can terminate the web administrator 188 process. In an alternate embodiment, the process monitor 190 can send a message to the user to notify the user that the system can be shut down after a specific time period if no user activity is detected.

Configuration server 165 provides one or more services (including administration services) to clients 154 through. 158. In one embodiment, configuration server 165 uses the server web administrator 180 to determine info concerning the configuration of the clients 154 through 158. Configuration server 165 may be coupled (e.g., directly or via a network) with a database 184 that is used to store and supply information for managing clients 154 through 158.

Configuration server 165 may be represented by one or more computing devices such as, for example, a desktop computer, laptop computer, server, etc. In one embodiment, configuration server 165 may include client interface 178, server web administrator 180, and database engine 182. Client interface 178 receives administration commands from server web administrator 180 and sends the commands to and receives responses from clients 154 through 158 using ports exposed by client web administrator 188, for example. Database engine 182 can be used to store in database 184 configuration information from clients 154 through 158, for example.

In an alternative network architecture, clients 154 through 158 may represent one or more network appliances operating in a network of an enterprise (customer network) that may include such devices as desktop computers, laptop computers, network printers, switches, routers, gateways, firewalls, or any other device having a network address. A network appliance may be a device that is configurable over a network to perform a network related function (e.g., network monitoring) upon connection with the customer network. The network appliance may host the client web administrator 188 and the process monitor 190 that were discussed in more detail below. Optionally, a client device (client) may be coupled with the network appliance for operation by an IT administrator or some other user. The client may be a computing device such as, for example, a desktop computer, laptop computer, server, etc. In one embodiment, the client may be used to present the user interface 186 for activating and configuring the network appliance. Alternatively, the network appliance may be activated and/or configured automatically, without any involvement of, and need for, the client.

The network appliance may interact with a service provider that provides one or more services to the customer network using a set of servers including the configuration server 165. The service provider may use the network appliance to collect information about the customer network and devices on the customer network. In particular, the network appliance may collect current characteristics of the devices including characteristics of their hardware components, operating systems, databases, network services, applications, websites, etc. The service provider uses the information provided by the network appliance to generate alerts and various reports for users such as IT administrators. The service provider may also generate network status updates, perform transactions, etc. The service provider may generate a user interface to allow users such as IT administrators to view reports and other information about the customer network (e.g., via the network appliance or the client coupled to the network appliance).

Figure 2:
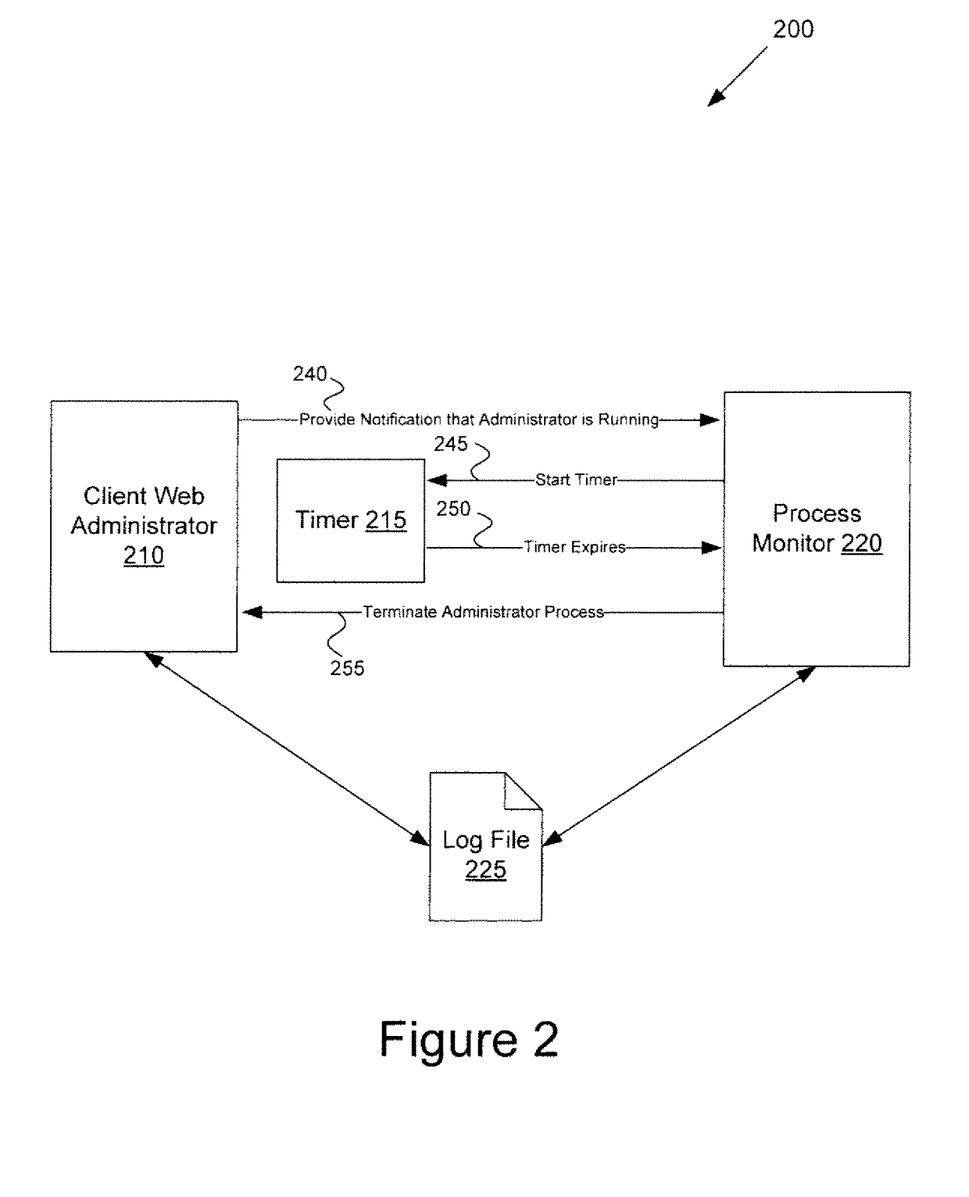
FIG. 2 is a data flow diagram that illustrates data transmitted between a web administrator and a process manager, in accordance with one embodiment of the present invention.

FIG. 2 illustrates a diagram 200 illustrating a mechanism for managing configuration interfaces, in accordance with one embodiment of the present invention. Referring to FIG. 2, client web administrator 210 interacts with process monitor 220 and writes information into a log file 225 that reflects current activity by a user (remote or local) using the client web administrator 210. Because the client web administrator 210 can be manually invoked by a user, it is possible that, for example, ports from the client web administrator 210 can remain exposed when a user forgets to terminate the client web administrator 210 process.

Initially, the process monitor 220 may determine that the process for client web administrator 210 has been invoked. In an embodiment, the process monitor 220 can make this determination by monitoring log files or active processes to determine whether the client web administrator 210 process is active. In another embodiment, the process monitor 220 can make this determination upon receiving a notification 240 from the client web administrator 210 (e.g., a procedure call used by the client web administrator 210 when the client web administrator 210 is invoked).

In response to determining that the client web administrator 210 has been invoked, the process monitor 220 uses a timer 215 (start timer 245) to determine the passing of a first time interval. In one embodiment, the process monitor 220 programs a hardware timer that produces a hardware interrupt upon the expiry of the timer. In another embodiment, the process monitor 220 can poll a running timer to determine elapsed time. In yet another embodiment, other combinations of the hardware and software techniques can be used. In Unix-type operating systems, "crontab" file can be used where a "cron" daemon executes commands specified in the crontab file wherein the commands are executed at (periodic) intervals defined in the crontab file.

Next, the process monitor 220 may determine the expiry of the timer 215 (timer expires 250). In response to a timer state, the process monitor 220 determines if the log file 225 reflects recent activity of the client web administrator 210. The process monitor 220 can determine whether log file 225 has changed by determining whether, for example, the file/time date attribute of the log file 225 has changed since a previous check by the process monitor 220. In another embodiment, the process monitor 220 can determine whether log file 225 has changed by examining the contents of the log file 225 to see if user input and/or user activity has occurred within the predefined time interval.

If no user activity has been determined by process monitor 220, the process monitor 220 sends communication 255 to client web administrator 210 to terminate the client web administrator 210 process.

If user activity has been determined by process monitor 220, the process monitor 220 optionally sends a communication 245 to timer 215 to restart the timer. The process monitor 220 then waits for a notification of the expiration of the timer 215 before making another determination whether the client web administrator 210 is actively being used.

Figure 3:
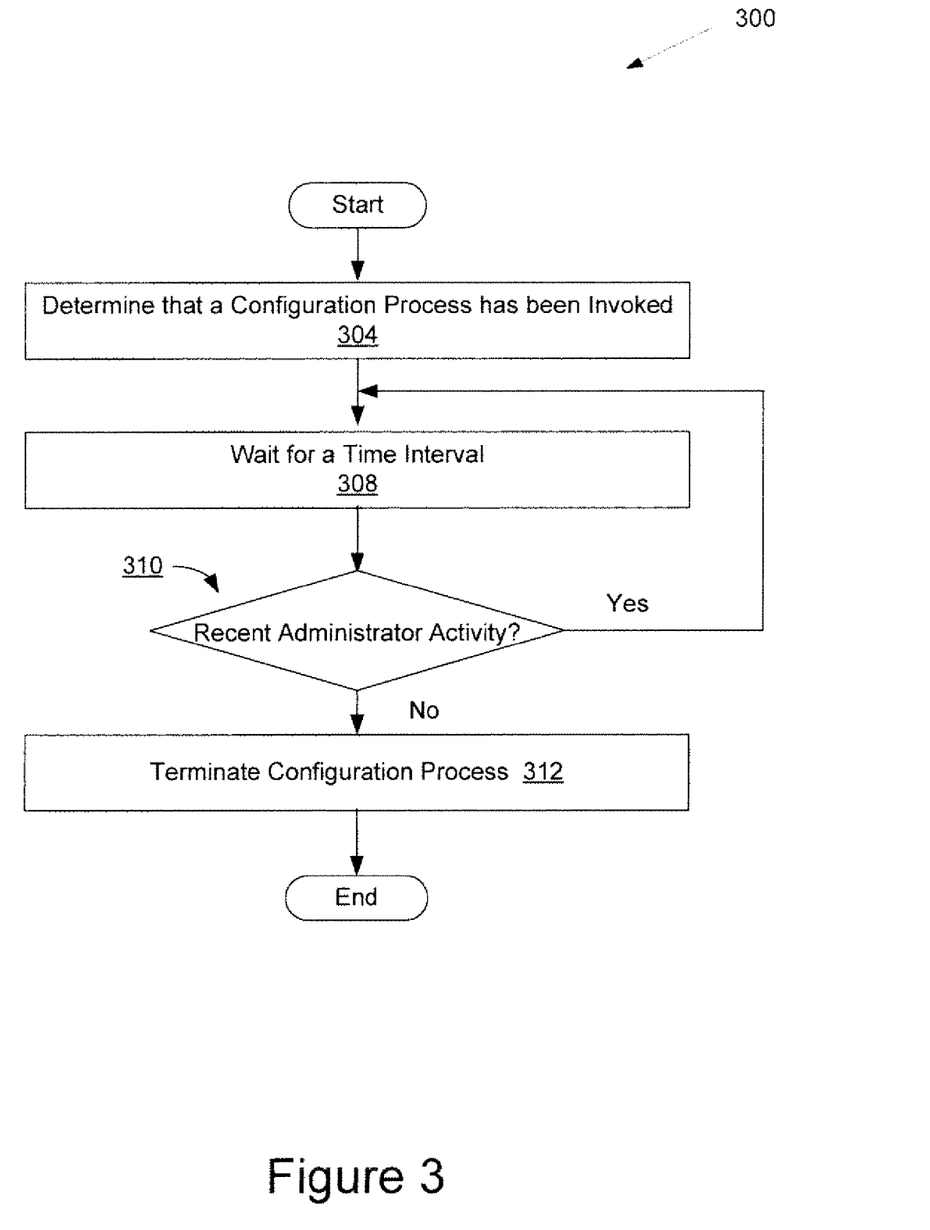
FIG. 3 is a low diagram illustrating one embodiment of a method 300 for managing a configuration interface, in accordance with one embodiment of the present invention.

FIG. 3 is a flow diagram illustrating one embodiment of a method 300 for managing a configuration interface. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a process monitor of client 156 of FIG. 1.

Referring to FIG. 3, method 300 begins at 304, where a process monitor determines that a configuration process in the device such as a network appliance is invoked. The configuration process can include activities such as configuration, administration, diagnostics, and the like. The configuration process can be invoked in response to a local or remote user (such as an administrator) login.

At block 308, the process monitor waits for a time interval. The time interval can be measured (and/or determined) by using a hardware or software timer. For example, a crontab file and cron daemon can be used to specify a periodic time interval, and to execute commands that are associated with the periodic time interval.

At block 310, the process monitor determines whether there has been recent user interaction with the configuration process (e.g., via a user interface provided by the configuration process). In response to the user interaction, the invoked configuration process updates the log file. Accordingly, the log file is typically updated at the time the user interaction is performed, or shortly thereafter. As the log file is updated, the operating system typically updates the date/time attribute of log file. The process monitor can determine whether there has been recent user interaction by, for example, examining the log file (for specific entries relating to user activity) and/or examining file attributes (such as the date/time attribute of the log file).

If the recorded times of user interactions (as determined from time stamps contained within the log file and/or determined from the date/time attribute of the log file) have occurred recently (for example within the specified time interval), control transfers to block 308, where the process monitor waits for the time interval and subsequently continues processing in accordance with the method. If recent user activity is not detected, control transfers to block 312.

At block 312, the configuration process is terminated. As discussed above, the termination of the configuration process results in closing exposed ports through which an administrator (or a third party, perhaps having malevolent intent) can gain access to the configuration process used to manage the device such as a network appliance.

Figure 4:
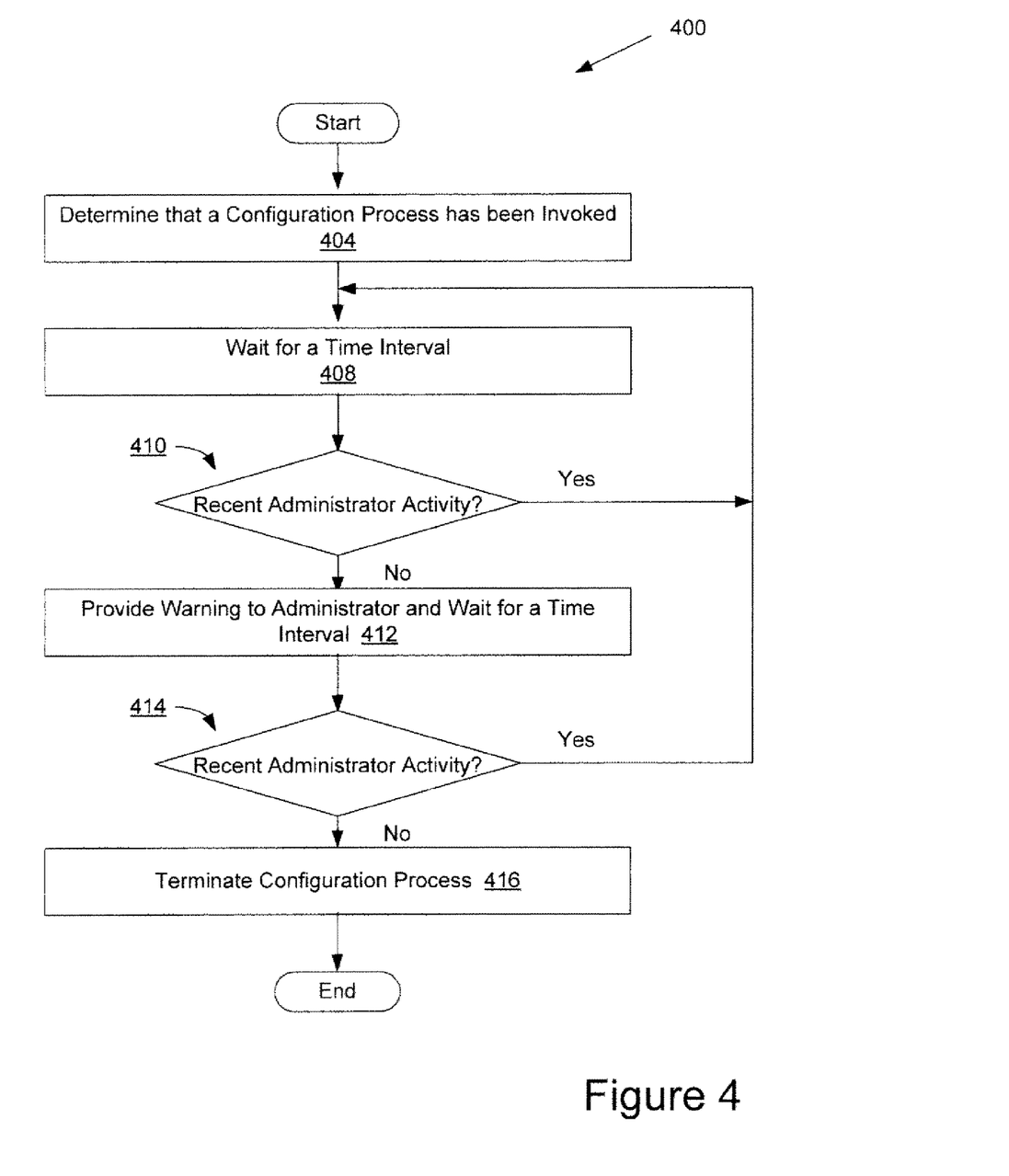
FIG. 4 is a flow diagram illustrating one embodiment of a method 400 for managing a configuration interface, in accordance with one embodiment of the present invention, in accordance with one embodiment of the present invention.

FIG. 4 is a flow diagram illustrating an embodiment of a method 400 for managing a configuration interface. The method may be performed by processing logic (that can be executed by the computer hosting the configuration database) that may comprise hardware (e.g., circuitry, dedicated logic, programmable logic, microcode, etc.), software (e.g., instructions run on a processing device to perform hardware simulation), or a combination thereof. In one embodiment, the method 400 is performed by a process monitor, hosted by the client 154 of FIG. 1.

Referring to FIG. 4, method 400 begins at block 404, where a configuration process in the device such as a network appliance is invoked. The configuration process can include activities such as configuration, administration, diagnostics, and the like. The configuration process can be invoked in response to a user login, such as a login of a local or remote administrator.

At block 408, the process monitor waits for a first time interval. The first time interval can be measured (and/or determined) by using a hardware or software timer. For example, a crontab file and cron daemon can be used to specify a periodic time interval, and to execute commands that are associated with the (periodic) first time interval.

At block 410, the process monitor determines whether there has been recent user interaction with the configuration process (e.g., via a user interface provided by the configuration process). The process monitor can determine whether there has been recent user interaction by, for example, examining the log file and/or examining file attributes. If the determinable times of user interactions have occurred recently, control transfers to block 408, where the process monitor waits for the time interval and then subsequently continues processing in accordance with the method. If recent user activity is not detected, control transfers to block 412.

At block 412, a warning is provided to the login user. The warning can be, for example, a popup window warning that the configuration process will be shut down if no activity is detected within a second time interval. The second time interval can be the same as (or different from) the time interval used in block 410. The time interval can be measured, for example, by a hardware or software timer, including using a crontab file and cron daemon.

At block 414, process monitor determines whether there has been recent user interaction with the configuration process. The process monitor can determine whether there has been recent user interaction by, for example, examining the log file and/or examining file attributes (such as the date/time attribute of the log file). Alternatively, recent user activity can be determined through an administrator responding to the example warning popup window.

If user activities have occurred recently (for example within the second time interval), control transfers to block 408, where the process monitor waits for the time internal and subsequently continues processing in accordance with the method. If recent user activity is not detected, control transfers to block 416.

At block 416, the configuration process is terminated. As discussed above, terminating the configuration process closes exposed ports through which an administrator (or a third party, perhaps having malevolent intent) can gain access to the configuration process used to manage the device such as the network appliance.

Figure 5:
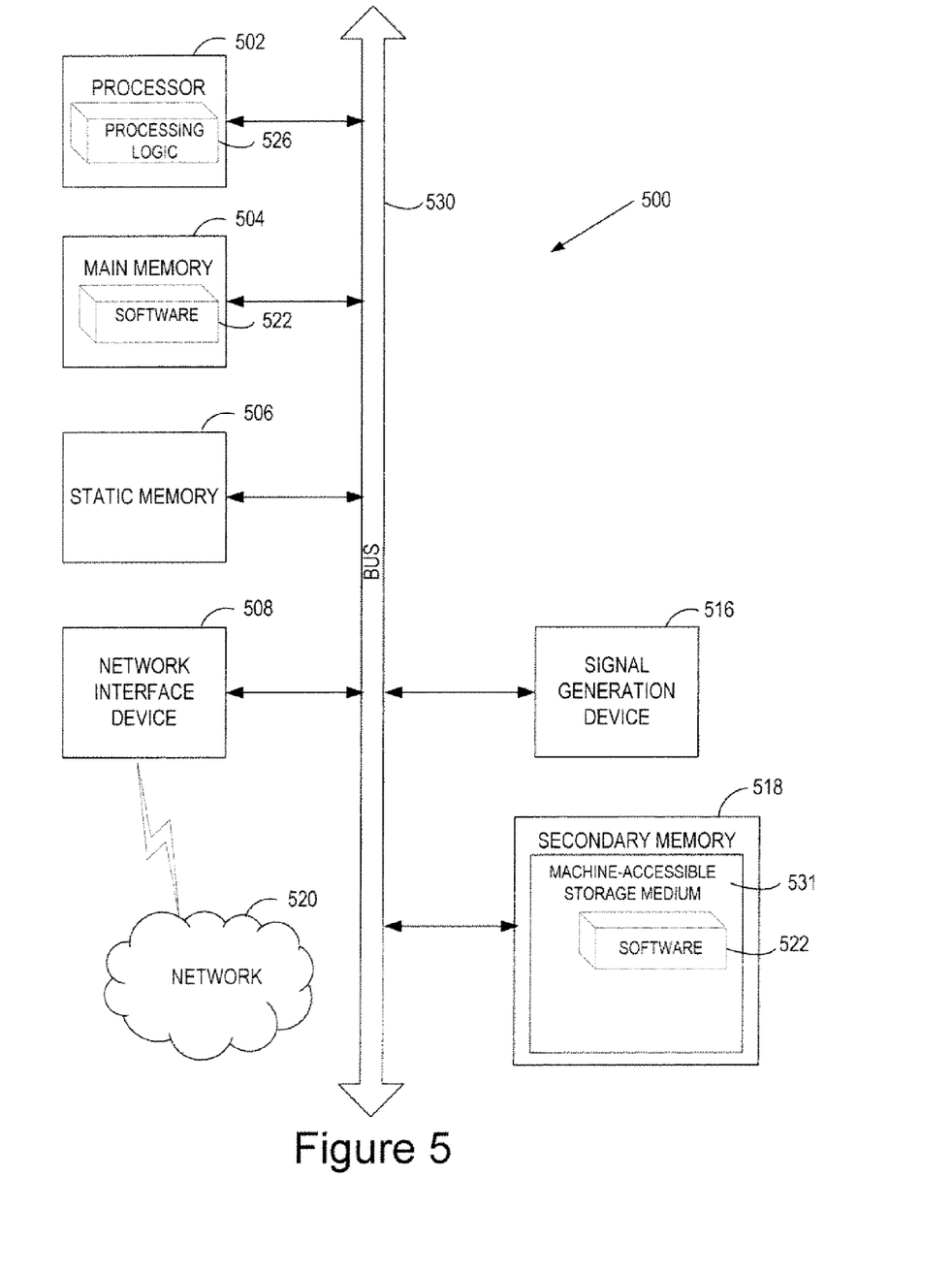
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other computing device.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), and a static memory 506 (e.g., flash memory, static random access memory (SRAM), etc.), which may communicate with each other via a bus 530. Alternatively, the processing device 502 may be connected to memory 504 and/or 506 directly or via some other connectivity means.

Processing device 502 represents one or more general-purpose processing devices such as a microprocessor, central processing unit, or the like. More particularly, the processing device 502 may be complex instruction set computing (CISC) microprocessor, reduced instruction set computing (RISC) microprocessor, very long instruction word (VLIW) microprocessor, or processor implementing other instruction sets, or processors implementing a combination of instruction sets.

The processing device 502 is configured to execute processing logic 526 for performing the operations and steps discussed herein.

The computer system 500 may further include a network interface device 508 and/or a signal generation device 516. It also may or may not include a video display unit (e.g., a liquid crystal display (LCD) or a cathode ray tube (CRT)), an alpha-numeric input device (e.g., a keyboard), and/or a cursor control device (e.g., a mouse).

The computer system 500 may or may not include a secondary memory 518 (e.g., a data storage device) having a machine-accessible storage medium 531 on which is stored one or more sets of instructions (e.g., software 522) embodying any one or more of the methodologies or functions described herein. The software 522 may also reside, completely or at least partially, within the main memo 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 531 is shown in an exemplary embodiment to be a single medium, the term "machine-accessible storage medium" should be taken to include a single medium or multiple media (e.g. a centralized or distributed database, and/or associated caches and servers) that store the one or more sets of instructions. The term "machine-accessible storage medium" shall also be taken to include any medium that is capable of storing encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    invoking, by a processing device of a computer system, a configuration process in the computer system, wherein the configuration process provides a user interface (UI) for a user of the computer system in order to at least one of configure, administer, or diagnose problems within the computer system, and wherein the configuration process is associated with a configuration server, communicably coupled to the computer system via a network, that provides configuration services targeted to the computer system;
    opening, in view of an instruction from the configuration process, a port of the computer system in order for the configuration process to communicate with the configuration server via the network;
    when a time interval associated with the configuration process expires, accessing a log file corresponding to the configuration process, wherein interactions of the user with the configuration process via the UI provided by the configuration process are recorded in the log file;
    identifying entries of the log file related to activity of the user of the computer system;

examining a file attribute of the log file to identify a most recent date and time of update to the log file;

determining, in view of the identified entries related to the activity of the user and the identified most recent date and time of the update to the log file, that the log file has not been updated within the time interval;

sending, in response to the determining that the log file has not been updated, a warning message to the user within the time interval, the warning message comprising an indication informing the user that the log file has not been updated in the time interval; and in response to the determination that the log file has not been updated and in response to a lack of feedback from the user in response to the warning message, terminating the configuration process, wherein terminating the configuration process results in closing the opened port.

2. The method of claim 1 wherein the configuration process is invoked by the user, wherein the user is a remote user that uses the opened port.

3. The method of claim 1, wherein the configuration process is invoked by the user, wherein the user is a local user.

4. The method of claim 1, wherein the determining whether the log file has not been updated is performed in response to an expiration of the timer.

5. The method of claim 1, further comprising determining that the log file has been updated in response to the user responding to the sent warning message.

6. The method of claim 1, further comprising:
determining that the log file has been updated within the time interval; and
waiting for another time interval before performing a subsequent determination of whether the log file has been updated.

7. A non-transitory machine-accessible medium including instructions that, when executed by a processing device, cause the processing device to perform operations comprising:

invoking, by the processing device of a computing device, a configuration process in the computing device, wherein the configuration process provides a user interface (UI) for a user of the computing device in order to at least one of configure, administer, or diagnose problems within the computer system, and wherein the configuration process is associated with a configuration server, communicably coupled to the computing device via a network, that provides configuration services targeted to the computing device;

opening, in view of an instruction from the configuration process, a port of the computing device in order for the configuration process to communicate with the configuration server via the network;

when a time interval associated with the configuration process expires, accessing a log file corresponding to the configuration process, wherein interactions of the user with the configuration process via the UI provided by the configuration process are recorded in the log file;

identifying entries of the log file related to activity of the user of the computing device;

examining a file attribute of the log file to identify a most recent date and time of update to the log file;

determining, in view of the identified entries related to the activity of the user and the identified most recent date and time of the update to the log file, that the log file has not been updated within the time interval;

sending, in response to the determining that the log file has not been updated, a warning message to the user within the time interval, the warning message comprising an indication informing the user that the log file has not been updated in the time interval; and in response to the determination that the log file has not been updated and in response to a lack of feedback from the user in response to the warning message, terminating the configuration process, wherein terminating the configuration process results in closing the opened port.

8. The non-transitory machine-accessible medium of claim 7, wherein the configuration process is invoked by the user, wherein the user is a remote user that uses the opened port.

9. The non-transitory machine-accessible medium of claim 7, wherein the configuration process is invoked by the user, wherein the user is a local user.

10. The non-transitory machine-accessible medium of claim 7, wherein the determining whether the log file has not been updated is performed in response to an expiration of the timer.

11. The non-transitory machine-accessible medium of claim 7, wherein the time interval is specified in a crontab file.

12. The non-transitory machine-accessible medium of claim 7, wherein the operations further comprise determining that the log file has been updated in response to the user responding to the sent warning message.

13. The non-transitory machine-accessible medium of claim 7, wherein the opened port are closed after waiting for another time interval.

14. An apparatus, comprising:
a memory;
a processing device communicably coupled to the memory;
a user interface (UI), executable from the memory by the processing device, to receive a user login, to cause a configuration process to be invoked, and to receive user input for managing the configuration process, wherein the configuration process provides the UI for a user of the apparatus in order to at least one of configure, administer, or diagnose problems within the apparatus, and wherein the configuration process is associated with a configuration server, communicably coupled to the apparatus via a network, that provides configuration services targeted to the apparatus;
a log file in the memory to store log file information in response to the received user input for managing the configuration process; and
a process monitor, executed from the memory by the processing device and coupled with the user interface and the log file, the process monitor to:
open, in view of an instruction from the configuration process, a port of the apparatus in order for the configuration process to communicate with the configuration server via the network;
when a time interval associated with the configuration process expires, access the log file corresponding to the configuration process, wherein interactions of the user with the configuration process via the UI provided by the configuration process are recorded in the log file;
identify entries of the log file related to activity of the user of the apparatus;
examine a file attribute of the log file to identify a most recent date and time of update to the log file;
determine, in view of the identified entries related to the activity of the user and the identified most recent date and time of the update to the log file, that the log file has not been updated within the time interval;
send, in response to the determining that the log file has not been updated, a warning message to the user within the time interval, the warning message comprising an indication informing the user that the log file has not been updated in the time interval; and in response to the determination that the log file has not been updated and in response to a lack of feedback from the user in response to the warning message, terminate the configuration process, wherein terminating the configuration process results in closing the opened port.

15. The apparatus of claim 14, wherein the process monitor is further to determine whether the log file has been changed by verifying that a file date and time attribute falls within the time interval.

16. The apparatus of claim 14, wherein the process monitor is further to determine whether the log file has been changed by evaluating contents of the log file.

17. The apparatus of claim 14, wherein the process monitor is further to:
   determine that the log file has been updated within the time interval; and
   wait for another time interval before performing a subsequent determination of whether the log file has been updated.

\* \* \* \* \*